June 27, 1950 A. SVOEKHOTOFF 2,512,981
APPARATUS FOR AUTOMATICALLY CALLING POLICE HELP
Filed July 2, 1945 11 Sheets-Sheet 1
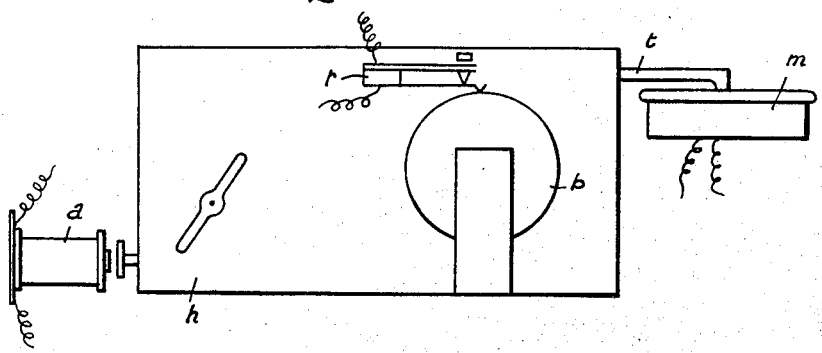
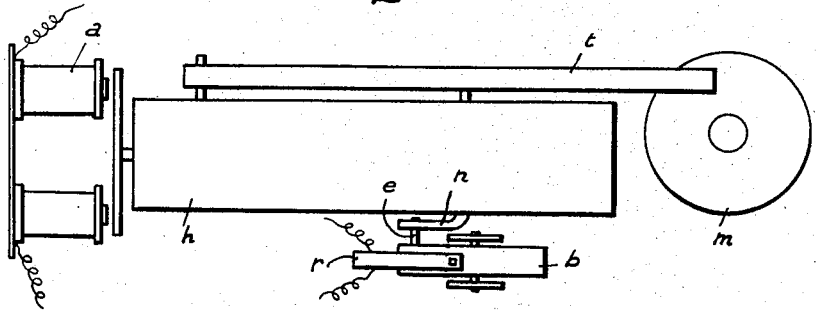
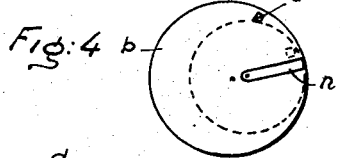
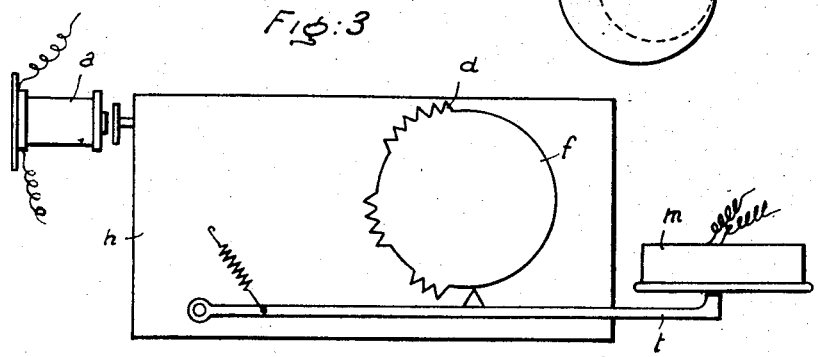
Inventor
A. Svoekhotoff June 27, 1950 A. SVOEKHOTOFF 2,512,981
APPARATUS FOR AUTOMATICALLY CALLING POLICE HELP
Filed July 2, 1945 11 Sheets-Sheet 2
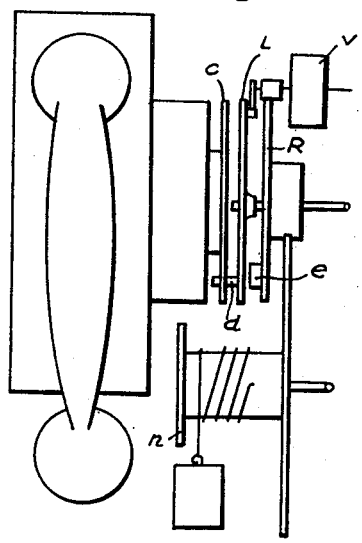
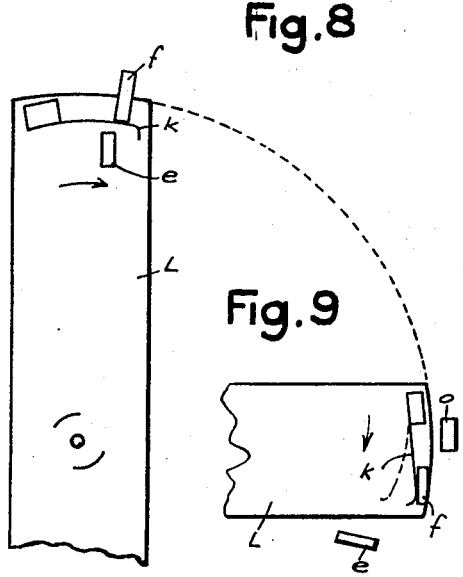
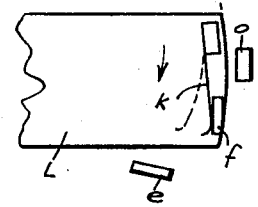
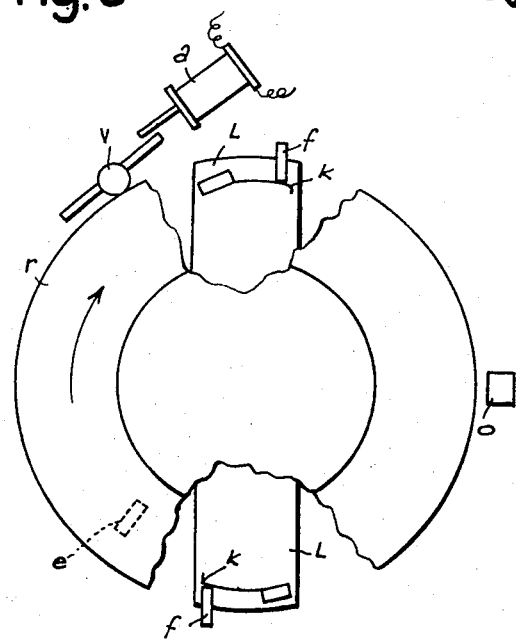
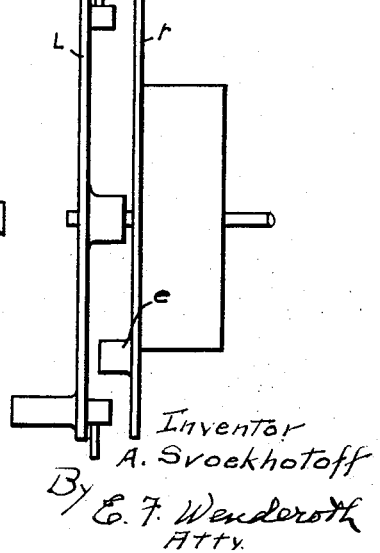
Inventor
A. Svoekhotoff
By E. F. Wenderoth
Atty.

June 27, 1950    A. SVOEKHOTOFF    2,512,981
APPARATUS FOR AUTOMATICALLY CALLING POLICE HELP
Filed July 2, 1945    11 Sheets-Sheet 3

Inventor
A. Svoekhotoff
By
E. F. Wenderoth
Atty

June 27, 1950  A. SVOEKHOTOFF  2,512,981
APPARATUS FOR AUTOMATICALLY CALLING POLICE HELP
Filed July 2, 1945  11 Sheets-Sheet 4

Inventor
A. Svoekhotoff
By
C. F. Wenderoth
Atty

June 27, 1950 A. SVOEKHOTOFF 2,512,981
APPARATUS FOR AUTOMATICALLY CALLING POLICE HELP
Filed July 2, 1945 11 Sheets-Sheet 5

Inventor
A. Svoekhotoff
By E. F. Wenderoth
Atty

June 27, 1950 A. SVOEKHOTOFF 2,512,981
APPARATUS FOR AUTOMATICALLY CALLING POLICE HELP
Filed July 2, 1945 11 Sheets-Sheet 6
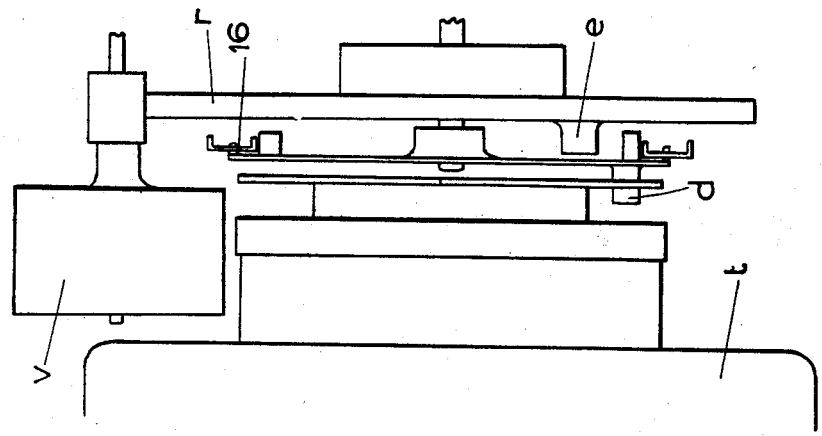
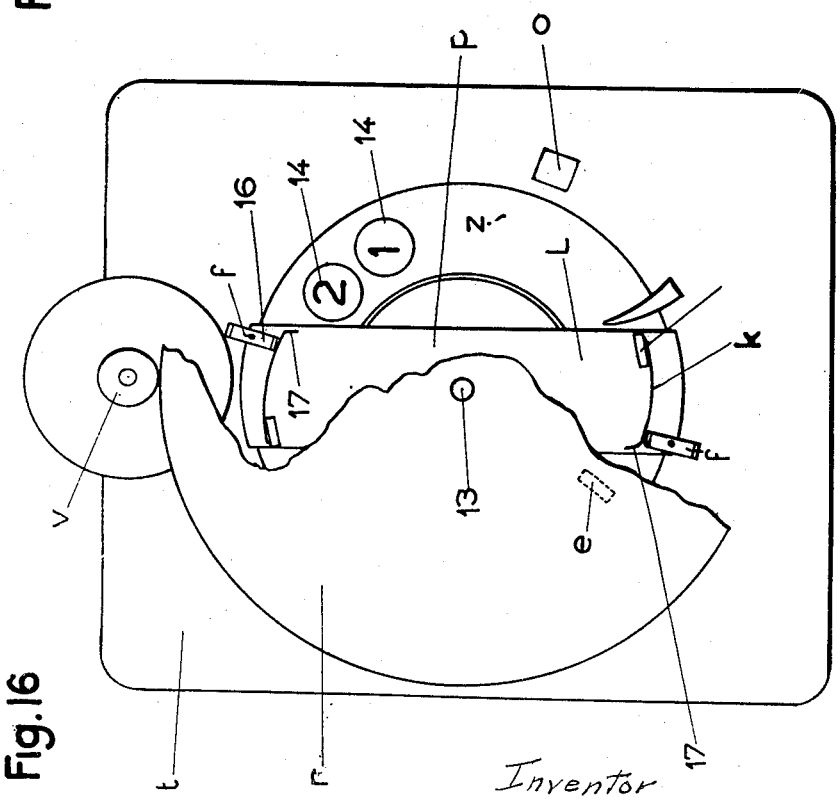
Inventor
A. Svoekhotoff
By C. F. Wenderoth Atty June 27, 1950 A. SVOEKHOTOFF 2,512,981
APPARATUS FOR AUTOMATICALLY CALLING POLICE HELP
Filed July 2, 1945 11 Sheets-Sheet 7

Inventor
A. Svoekhotoff
By C. F. Wenderoth
Atty

June 27, 1950 A. SVOEKHOTOFF 2,512,981
APPARATUS FOR AUTOMATICALLY CALLING POLICE HELP
Filed July 2, 1945 11 Sheets-Sheet 8
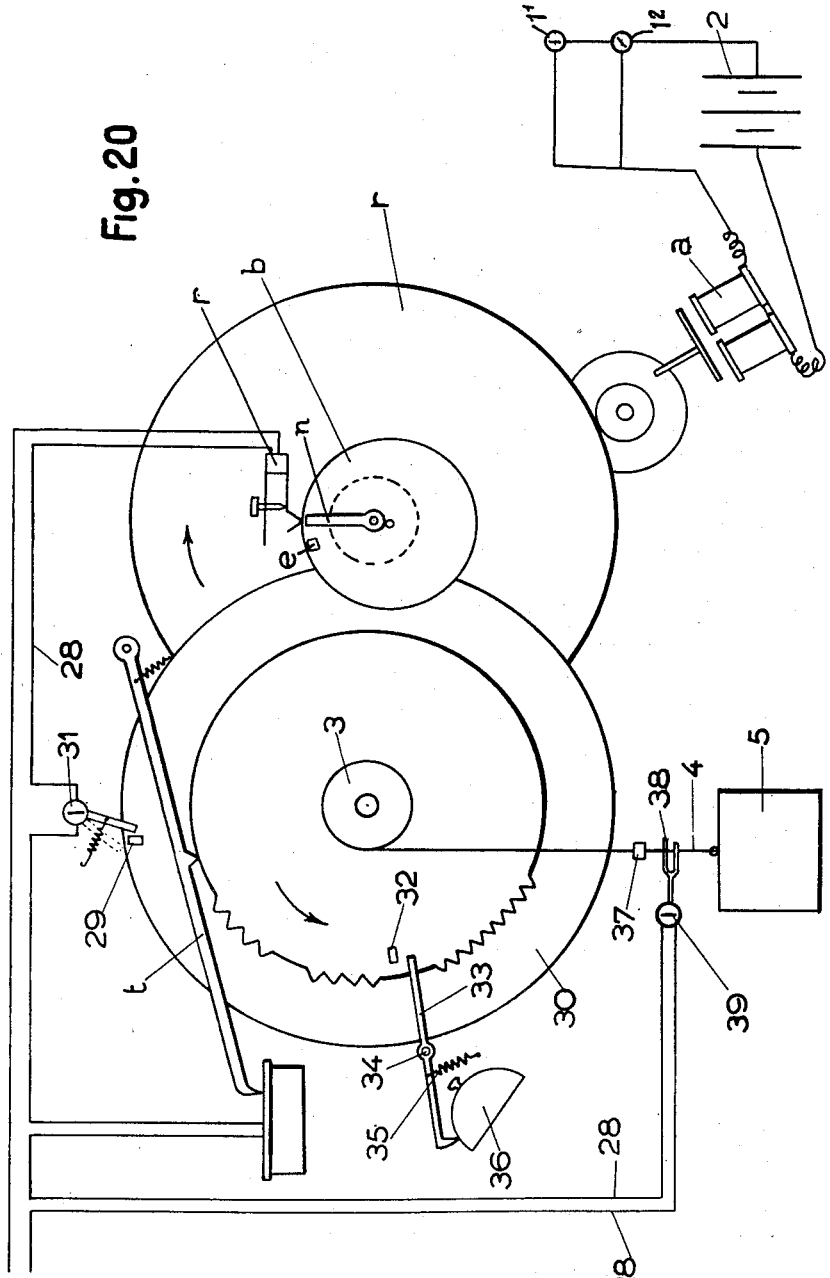
Inventor
A. Svoekhotoff
By C. F. Wenderoth
Atty June 27, 1950     A. SVOEKHOTOFF     2,512,981
APPARATUS FOR AUTOMATICALLY CALLING POLICE HELP
Filed July 2, 1945     11 Sheets-Sheet 9

Inventor
A. Svoekhotoff
By C. F. Wenderoth
Atty

June 27, 1950 A. SVOEKHOTOFF 2,512,981
APPARATUS FOR AUTOMATICALLY CALLING POLICE HELP
Filed July 2, 1945 11 Sheets-Sheet 10

Inventor
A. Svoekhotoff
By C. F. Wenderoth
Atty

June 27, 1950     A. SVOEKHOTOFF     2,512,981
APPARATUS FOR AUTOMATICALLY CALLING POLICE HELP
Filed July 2, 1945     11 Sheets-Sheet 11

Inventor
A. SVOEKHOTOFF

By Wenderoth, Lind & Ponack
Attorneys

Patented June 27, 1950

2,512,981

UNITED STATES PATENT OFFICE 2,512,981

APPARATUS FOR AUTOMATICALLY CALLING POLICE HELP

Alexandre Svoekhotoff, Paris, France

Application July 2, 1945, Serial No. 602,740
In France April 20, 1944

3 Claims. (Cl. 179—5)

The present invention has for its object to provide an apparatus for automatically calling police help or any other station thru the use of the telephonic circuits by the simple actuation of a control organ.

The invention has also for its object to send to the called station the indications permitting to identify the calling station.

Apparatuses for automatically calling police help or any other station and making it possible to attain the above mentioned objects show the characteristic features which result from the following description and more particularly from the appended claims.

Figure 1 is a diagrammatical elevational view showing the whole apparatus.

Figure 2 is a diagrammatical plan view showing the apparatus of Figure 1.

Figure 3 is a diagrammatical view showing the apparatus for the transmission of the sound-signals characterizing the calling station.

Figure 4 shows the barrel for the composition of the telephone number of the called station.

Figure 5 is a profile view showing another form of execution of the apparatus.

Figure 6 is an elevational view showing the telephone-dial and its control blade.

Figure 7 is a profile view showing the telephone-dial and the control blade.

Figure 8 is an elevational view showing the control-blade of the telephone-dial.

Figure 9 is a view partially showing the control blade of the telephone-dial in another working position.

Figure 16 is a partial sectional elevational view showing the device for the composition of the number of the called telephone-station.

Figure 17 is a profile view showing the device of Figure 16.

Figure 20 is a diagrammatical elevational view showing another form of execution of the apparatus according to the invention.

Figure 10:
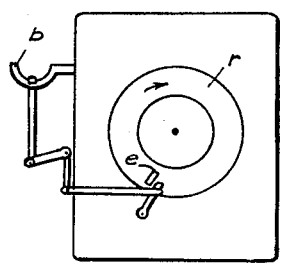
Figures 10 and 11 show the apparatus and the hook of the microphone in the working positions respectively.

The apparatus is connected up on the existing telephone-line. It comprises (Figures 1 and 2):

(1) A clockwork $h$ maintained in the inoperative position by any locking device, the unlocking being effected thru an electromagnet $a$ controlled by a button located, preferably, in a secret place, (2) Any circuit-breaker device $r$ acting as a composing barrel for the composition of the numbers in telephone-sets. It is this device which will establish the communication with police help. The barrel with the independent axis $b$ is driven by the arm $n$ of the clockwork. As it is necessary that the barrel-breaker is set in motion only a few seconds after the release of the apparatus, the arm $n$ will be located at a certain distance from the spur $e$ of the barrel. After having attained said spur the arm $n$ will drive the barrel on a portion of its travel and the interruption of the current will be produced by the breaker $r$ as many times as it is necessary for composing the number of the local police help, whereafter the arm $n$ will leave the spur $e$ since it is not on the same axis as the barrel (Figures 2 and 4);

(3) A sound-device, a hammer $t$ striking on a microphone $m$ and thus transmitting to police help the special subscriber-number under which the subscriber is inscribed at police help. It is the wheel $f$ carrying teeth in a number corresponding to said number which actuates the hammer $t$.

The apparatus works as follows:

One pushes the button controlling the electromagnet $a$ which unlocks the clockwork. The latter is set in motion. After a few seconds the arm $n$ strikes against the spur $e$ of the barrel-breaker $b$ and carries it along on part of its travel. The barrel will provoke interruptions of the current in the breaker $r$ as many times as it is necessary for composing the number of local police help. The policeman on duty having heard the call grasps the receiver and hears the special subscriber number under which the subscriber is registered. Said number is given to him by sound-signals produced by the hammer $t$ striking on the microphone $m$ and repeated several times till the spring is exhausted.

A simple reference to the list of these special subscribers gives the police the immediate indication of the name and of the address of the person calling for help.

Figure 11:
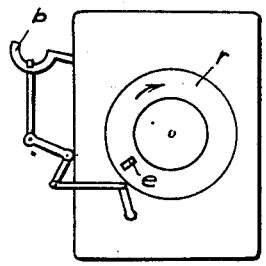

According to another form of execution (Figures 5 to 12) the apparatus comprises:

(1) A clockwork actuated by a spring or a weight (this latter solution offers, of course, more security and the supplementary place required is of no importance since said clockwork will be located in a lumber-room, garret or the like). Of course, said clockwork is provided with any governor $v$ and maintained in the inoperative position by any locking device controlled by an electro-magnet $a$. For releasing the apparatus it is then sufficient to push an electric button located in a secret place. The current which is necessary for the working of the electromagnet will be supplied by a cell or a battery;

(2) A device freeing the hook $b$ of the telephone-receiver, thus permitting said hook to be lifted and to establish the current on the line. As an indication only, Figures 10 and 11 show a system maintained in the position of rest by the spur $e$ of the wheel $r$. As soon as the clockwork is set in motion the hook $b$ will be lifted;

(3) A device for the composition of the number for calling police help. The small board L (Figures 6 and 7) carries at its lower extremity a finger $d$ engaging one of the holes of the telephone-dial $c$ (Figure 5). Furthermore, it possesses at each extremity a spring $k$ maintained in the position indicated in Figure 6 by a locking device $f$. When the wheel $r$ is set in motion the spur $e$ which it carries encounters during its travel the spring $k$ of the top of the small board and carries along this latter the finger $d$ of which will drive the telephone-dial $c$. This movement of the whole will continue till the locking device $f$ strikes during its travel against the buffer $o$. The spring $k$ will allow the spur $e$ to escape (Figure 9) on the wheel $r$. Owing to this fact, the small board will return to its starting position, carried along by the telephone-dial. The first digit of the called number is thus composed. Now, the wheel $r$ will continue its movement and the spur $e$ will strike against the spring $k$ on the lower extremity of the small board. The latter and the telephone-dial are then set in motion again and return to their starting position in the same manner as for the first time after having encountered the buffer $o$. The second digit of the called number is then composed.

Figure 12:
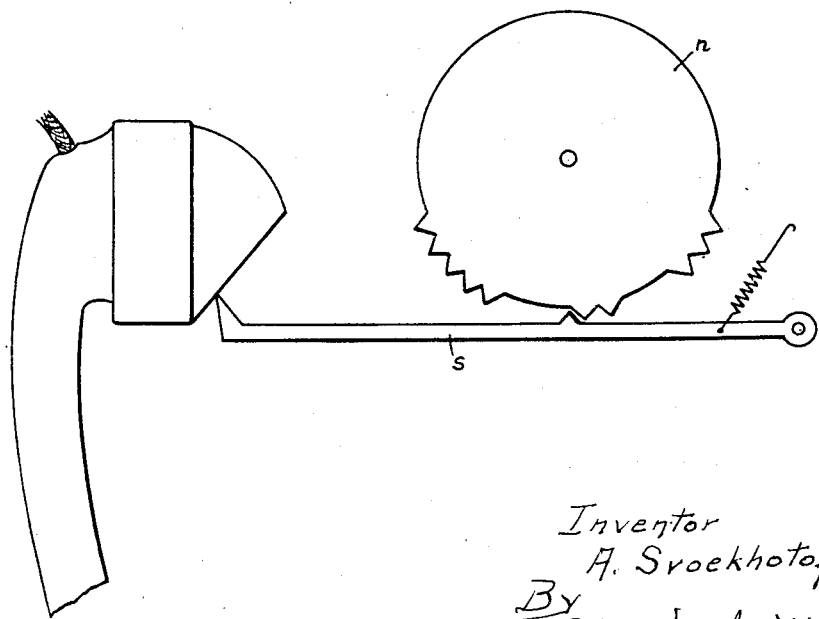
Figure 12 is a diagrammatical view showing the device for the transmission of the sound-signals characterizing the calling station.

(4) A device for the transmission of sound-signals (Figure 12). It is a hammer $s$ or push-button or a like piece of any form striking against the microphone of the receiver a number of blows corresponding to the special number of the subscriber. Said device is actuated by the wheel $r$ which carries teeth arranged in groups and sufficiently spaced for obtaining the separation of the digits of the number to be transmitted. These transmissions will be repeated till the clockwork is exhausted. The arrangement of the teeth must permit a protracted arrest of the hammer after every transmission.

The details and the form of the pieces ($f$, $k$, $s$ and $c$) are given here only by way of indication. Since they can be varied ad infinitum their modification can, of course, by no means form the subject of a patent application, nor the modification of the arrangement of the organs of the apparatus.

The apparatus works as follows:

By pushing the electric button the subscriber to police help establishes the circuit. The electromagnet $a$ unlocks the clockwork which starts off. The hook $b$ is lifted. The current is, therefore, established in the line. A few seconds after this the spur $e$ of the wheel $r$ will stike again on the spring $k$ at the top of the small board and, owing to this fact, said board and the telephone-dial $c$ will be driven till the locking device $f$ strikes against the buffer $o$. Then the spring $k$ immediately allows the spur $e$ to escape and the small board as well as the dial will return to their starting position under the action of the spring of the dial. Thus, the first digit of the called number is composed.

The spur $e$ of the wheel continues its travel and strikes against the second spring $k$ on the lower extremity of the small board, which latter is carried along with the telephone-dial till the locking device encounters the buffer $o$. In the like manner as for the first time the small board and the dial will immediately return to their starting position and the second digit of the call number of police help is thus composed.

The hammer $s$ strikes on the microphone of the receiver under the action of the teeth of the wheel $r$. The policeman of police help having heard the telephonic call grasps the receiver and hears the sound-signals transmitted by the hammer (said signals being transmitted to him several times successively). By referring to the list of the special subscribers the policeman finds opposite the number which has been transmitted the name and the address of the person who calls for help.

Figure 13:
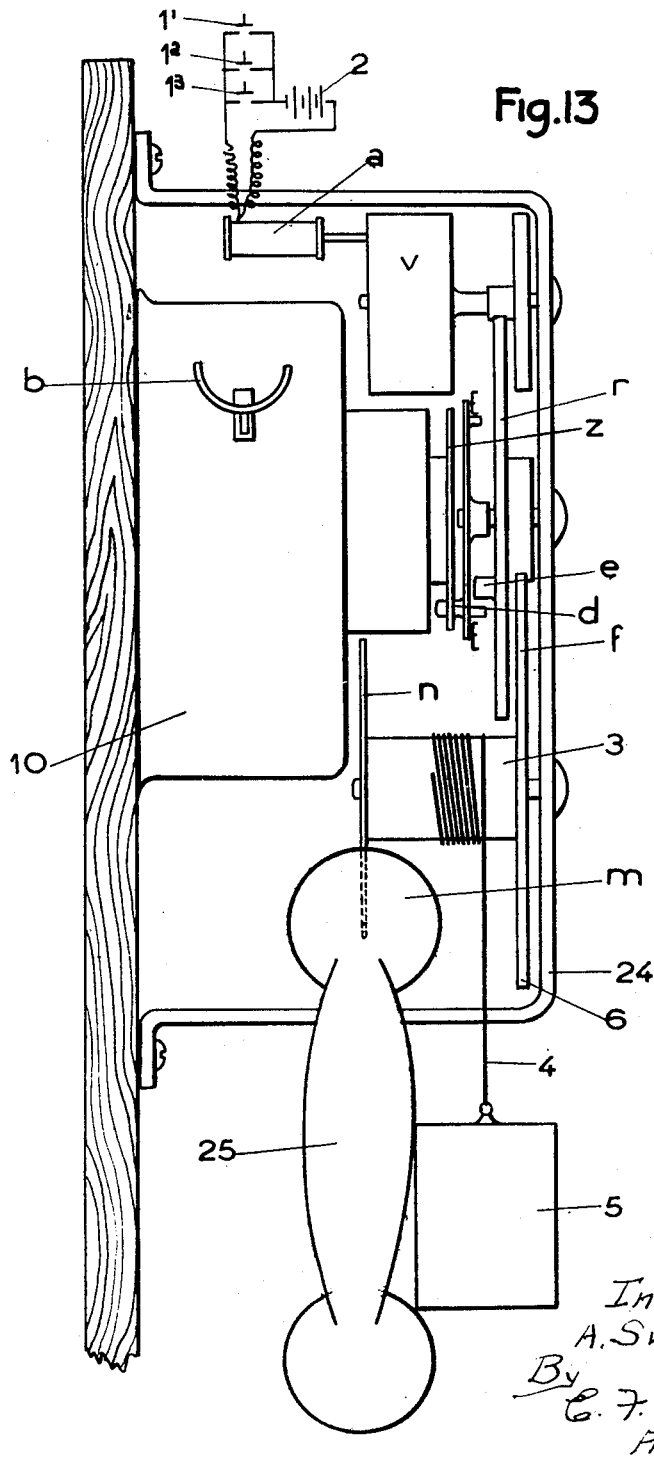
Figure 13 is a diagrammatical profile view showing another form of execution of the apparatus.
Figure 14:
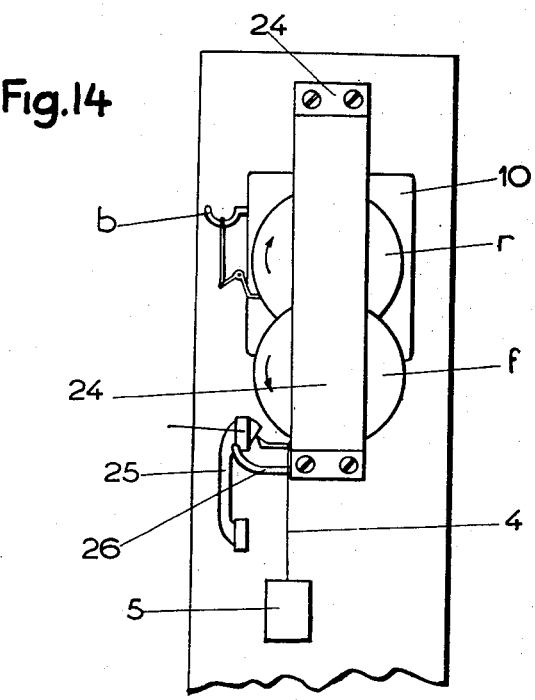
Figure 14 is a diagrammatical elevational view showing the apparatus of Figure 13.

The apparatus shown in the whole in Figures 13 and 14 is formed of the following main groups of organs:

(1) The mechanism for connecting up the telephone-set and calling the desired number, and (2) The mechanism giving to the called telephone-station (police help, for instance) the indication of the calling apparatus.

The mechanism for connecting up the telephone-set and for calling the desired number comprises an electromagnet $a$ for putting the calling apparatus in action.

This electromagnet is controlled by buttons $i^1$, $i^2$, $i^3$ and so on mounted in parallel and closing the circuit of the electromagnet $a$ on the feeding source 2.

Said source 2 is advantageously formed of galvanic cells or storage batteries or of the town mains.

The control buttons $i$ are preferably located in different places of the suite of rooms and concealed.

The energization of the electromagnet $a$ by pushing one of the control buttons $i$ controls the release of the clockwork. Said clockwork is adapted for supplying the energy which is necessary for insuring the different movements of the various organs of the apparatus, that is to say of the organs controlling the connecting up of the telephone-set, the formation of the number to be called and the transmission of the indication of the calling number.

Said clockwork is advantageously formed of a mechanism actuated by a weight. For this purpose it comprises a drum 3 on which is wound a cable, rope or wire 4 ending in a weight 5. The drum 3 is fast with a toothed wheel 6 engaging a train of gears controlling the rotation of the various wheels of the mechanism (Figure 13). The whole mechanism works as follows:

By pushing one of the control buttons 1 one controls the attraction of the electromagnet which provokes the unlocking of the clockwork which starts off. The rotation of the clockwork successively provokes the connecting up of the telephone, the composition of the telephone-number to be called and the indication of the calling telephone-number. The different working steps are effected by the devices which will be described now.

The device for connecting up the telephone set is formed of a system of linked levers 7, 8 and 9 (Figure 15) acting upon the hook carrying the combined piece of the telephone-set.

For this purpose, a first lever 7 is linked on the hook b of the telephone-set 10. Its other extremity is linked to an arm $8^1$ of a fork 8 rocking about an axis 11. The other arm $8^2$ of the fork is linked to its lever 9 provided with a hook 12 co-acting with a spur e carried by a wheel r driven by the clockwork.

Figure 15:
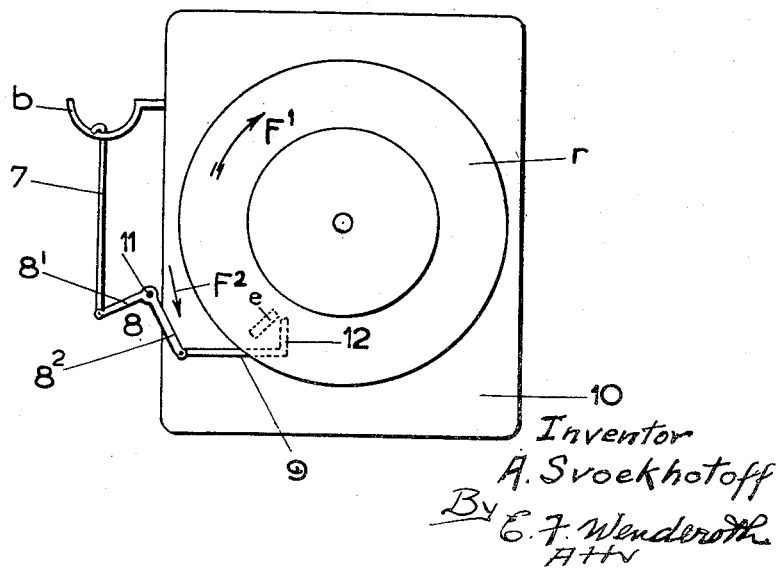
Figure 15 is a diagrammatical elevational view showing the device for lifting the hook of the telephone-set.

The rotation of the clockwork drives the wheel r in the direction of the arrow $F^1$ (Figure 15). Accordingly, the spur e frees the hook 12 of the lever 9.

The lever 9 is lifted and provokes the rotation of the fork 8 as well as the lifting of the hook b of the telephone-set 10.

The device for composing the number of the called station is made in the following manner, as results from the above quoted explanations.

A bar L rotates loosely about an axis 13. This axis 13 is located in prolongation of the disc z for the selection of the telephone-numbers and serves as a shaft of rotation for the wheel r located just behind said bar L.

Said bar comprises a stud d on its face opposite the disc z for the selection of the numbers. Said stud engages one of the openings 14 provided in the discs z for the selection of the numbers so that the bar L is fast with said disc z (Figures 13 and 17).

Figure 18:
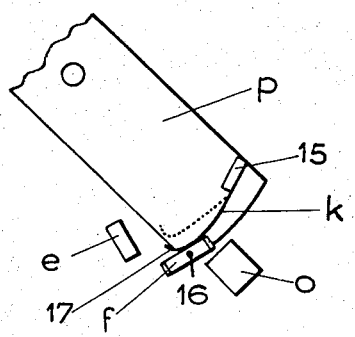
Figure 18 shows the disconnecting device for the bar driving the disc for the selection of the numbers.

On its other face and at each of its extremities the bar L carries a blade spring k mounted on a support 15 (Figures 17 and 18).

The extremity of each spring is bent and forms a hook 17.

Above each spring k is arranged a locking finger f rocking about an axis 16. The extremity of each locking finger f normally rests on the corresponding spring k.

A fixed stop o is carried by the frame of the apparatus and can come into contact with each locking finger f.

The device for composing the number of the station to be called works as follows:

After having lifted the hook of the set, the finger e comes after a certain rotation into contact with the hook of one of the springs.

The wheel r then carries along the bar L and, accordingly, the disc z for the selection of the numbers which is fast with it thru the stud d.

This driving movement is effected till the locking finger f corresponding to the spring k receiving the spur e comes into contact with the fixed stop o.

Said stop o causes the locking finger f to rock about its axis 16.

The spring k rises, thus releasing the spur e. Accordingly, the bar L is released from the wheel r and returns to its initial position under the action of the springs returning the disc for the selection of the numbers.

The first digit of the number to be called is thus composed.

The second digit is composed in the like manner, the spur e carrying along the bar L thru the second spring k till the corresponding locking finger encounters the stop o.

Both digits forming the number to be composed are thus selected and the telephone-set is in communication with the desired station.

Figure 19:
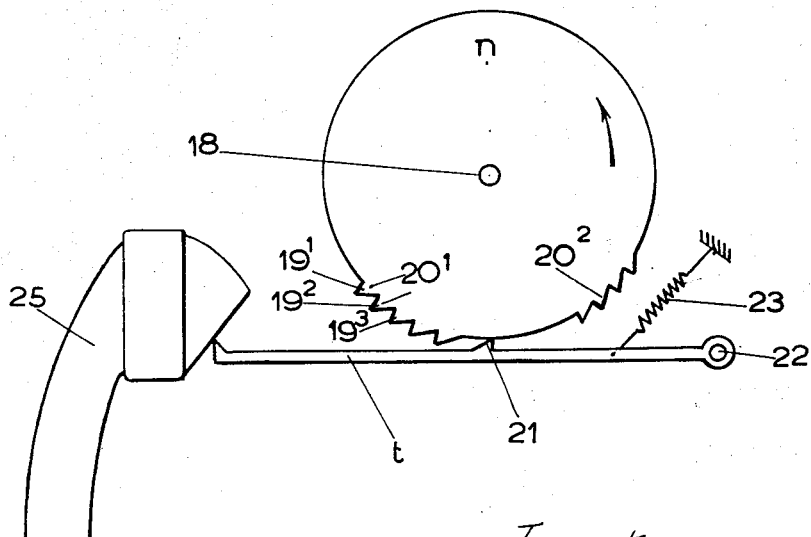
Figure 19 is a diagrammatical elevational view showing the device for the transmission of the sound-signals characterizing the calling station.

At this moment the telephone must transmit the indication of its number or any other indication. To this end, the clockwork drives a cam n rotating about an axis 18 (Figure 19).

This cam comprises a plurality of series $20^1$, $20^2$ of teeth $19^1$, $19^2$, $19^3$ co-acting with the tooth 21 of a lever F rocking about an axis 22.

The extremity of this lever is in contact with the outer casing of the microphone under the action of a return spring 23.

The number of series 20 of teeth 19 is equal to the number of digits and letters of the number of the telephone-station which is calling.

Each series comprises a number of teeth 19 which is, for instance, equal to the number of units of the corresponding digit of the number.

Said device works as follows:

The telephonic communication being established, the clockwork drives the cam n in rotation.

At every passage of a tooth 19 of the cam n on the tooth 21 the lever 8 rocks about its axis 22 and comes to strike against the microphone m which transmits every blow to the receiving telephone-station f.

Thus, the agent in charge of the receiving station having heard the call grasps the receiver and hears the sound-signals transmitted by the hammer, which gives him the indication of the number of the calling telephone-station.

By referring to the list of the subscribers this agent finds opposite the transmitted number the name and the address of the calling station.

The signals transmitted by the lever 8 can be repeated several times in succession. It is sufficient to maintain the movement of rotation of the cam n during a certain number of turns.

The clockwork of the various devices which co-operate in the working of the apparatus is mounted on a support 24 surrounding the telephone-set.

The combined piece 25 hangs from a hook 26 located in the lower part of the support.

The called telephone-station can be police help or any other station such as the fire-brigade or the like. The buttons 1 can be controlled automatically, for instance by the opening of a door or by any other condition.

Numerous modifications can be brought to the above described apparatus without departing from the scope and spirit of the invention.

More particularly, one can directly control the impulses of current selecting the called telephone-station without operating thru the medium of the disc for the selection of the numbers (Figure 20).

To this end, a drum b is mounted laterally with respect to the wheel r. This drum rotates about an axis which is parallel to the axis of the wheel r. Said drum b carries a finger n which coacts with the spur e of the wheel r. A breaker r coacts with the drum b and establishes the successive impulses in the telephone-lines for characterizing the called number. After having made half a revolution the drum escapes from the spur e which follows an offset course eccentric with respect to said drum b.

Figure 21:
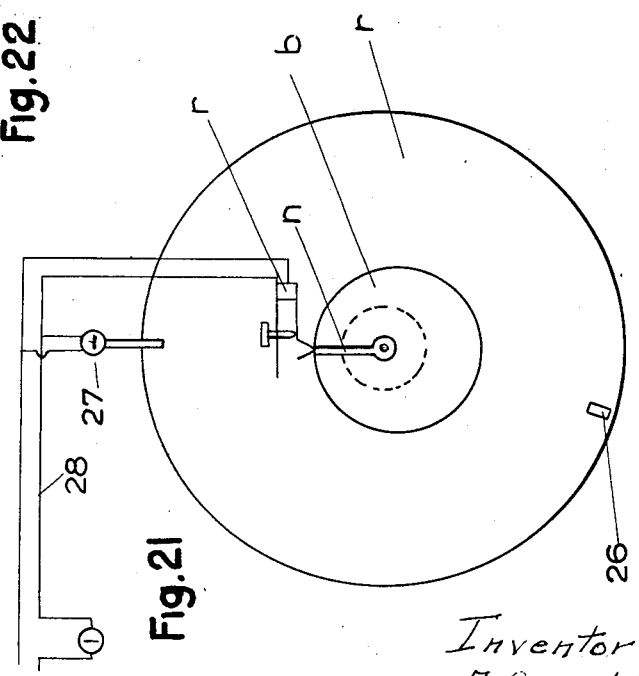

According to another form of execution the drum b is fast with the wheel r which carries a spur 26 (Figure 21).

During the rotation of the wheel r said spur 26 acts upon an electric contact 27 which short-circuits the telephone-circuit 28 so that after the composition of the called number by the drum b and the breaker r the device works further without transmitting any other called number.

According to the invention the apparatus of Figure 20 comprises the various following organs which permit to improve the working of the apparatus.

(1) The connecting up of the telephone-set is effected by means of a spur 29 carried by a wheel 30 of the clockwork.

When the clockwork starts off this spur 29 co-acts with a contact 31 which closes the telephone-circuit.

(2) The beginning of the transmission of the number of the calling telephone-station is indicated by a bell-sound.

For this purpose, on the beginning of the travel of the cam n a spur 32 presses on a hammer 33 rocking about an axis 34 and returned by a spring 35.

The passage of the spur 32 provokes the rocking of the hammer 33 and the striking of the same on a bell 36 after the beginning of the number of the calling telephone-station indicates by this bell-sound the beginning of the transmission.

(3) The putting out of circuit of the telephone after the transmission of its indicative number is effected by a stop 37 mounted on the rope 4 carrying the weight 5 of the clockwork. A fork 38 surrounds the rope 4. Said fork 38 controls an electric contact 39 which normally establishes the communication with the telephone-line 28.

As the working of the apparatus proceeds the weight 5 of the clockwork goes down and the stop 37 comes into contact with the fork 38 which rocks and opens the contact 39.

The telephone-circuit is thus interrupted and rendered free after the working of the apparatus.

Figure 22:
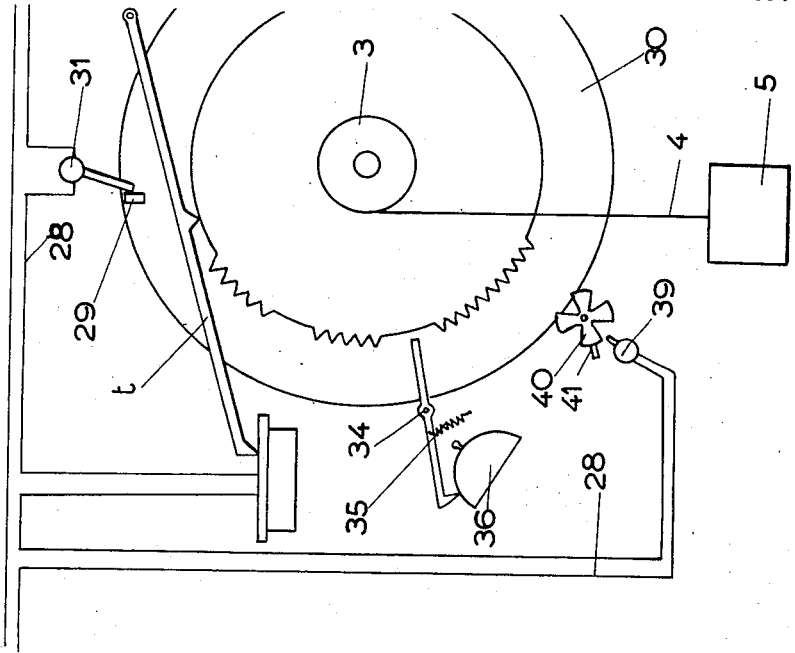
Figures 21 and 22 are partial views showing two other forms of execution of the arrangement of Figure 20

According to another form of execution (Figure 22) the spur 29 of the wheel 30 co-acts with one of the arms of a Maltese cross 40. Said Maltese cross carries a spur 41 controlling the electric contact 39 which normally establishes the connection with the telephone-line 28.

This device works as follows: During each revolution of the wheel 30 the spur 29 advances the Maltese cross by one tooth. On the last revolution the spur 41 of the Maltese cross pushes the electric contact 39 which is opened.

The telephone-circuit is thus interrupted and rendered free after the working of the apparatus.

Figure 23:
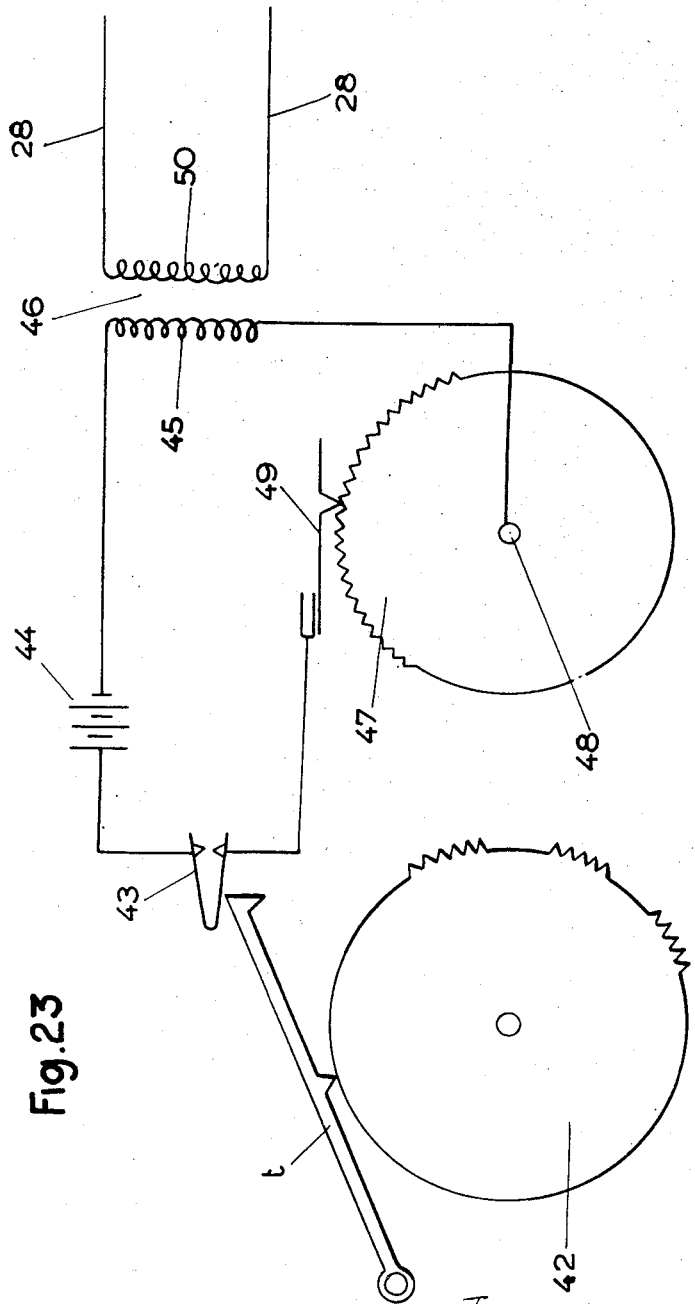
Figure 23 is a diagrammatical view showing another form of execution of the device for the transmission of the sound-signals.

Figure 23 shows another form of execution of the device for the transmission of sound-signals.

Said device comprises a cam 42 driven by the clockwork. Said cam co-acts with the hammer t as indicated before.

The extremity of the hammer t actuates an electric contact 43 at the cadency of the teeth of the cam 42 characterizing the number of the calling telephone-station.

Said contact, which is thus successively closed and opened, is put in series in an electric circuit comprising a source of electric current 44, the primary winding 45 of a transformer 46 and a circuit-breaker 47.

The circuit-breaker 47 is intended for repeatedly interrupting the direct current supplied by the source 44. Said breaker is formed of an elastic blade 49 resting against a toothed wheel 47 to which a movement of rotation about its axis 48 is imparted by the clockwork. The rotation of the toothed wheel 47 provokes the lifting of the blade 49 at the cadency of the passage of the teeth. This effects the interruption of the electric current supplied to the blade 49 and leaving the latter thru the shaft 48 of the toothed wheel 47.

The secondary winding of the transformer 46 is connected with the telephone-line 28.

The device for the transmission of the sound-signals works as follows:

The contact 43 establishes at the cadency of the rocking movements of the hammer t the electric circuit feeding the transformer 46.

The current is repeatedly interrupted in this circuit by the circuit-breaker 47 and supplied to the primary winding of the transformer 46 in the form of an undulated current.

It results therefrom that the secondary winding 50 of the transformer 46 is the seat of an alternating electromotive force interrupted at the cadency of the passage of the teeth of the cam 42. This current is transmitted to the receiving station by the telephone-line 28.

The receiving agent then hears an interrupted crackling at the cadency of the passage of the teeth of the cam 43 characterizing the calling station.

Figure 24:
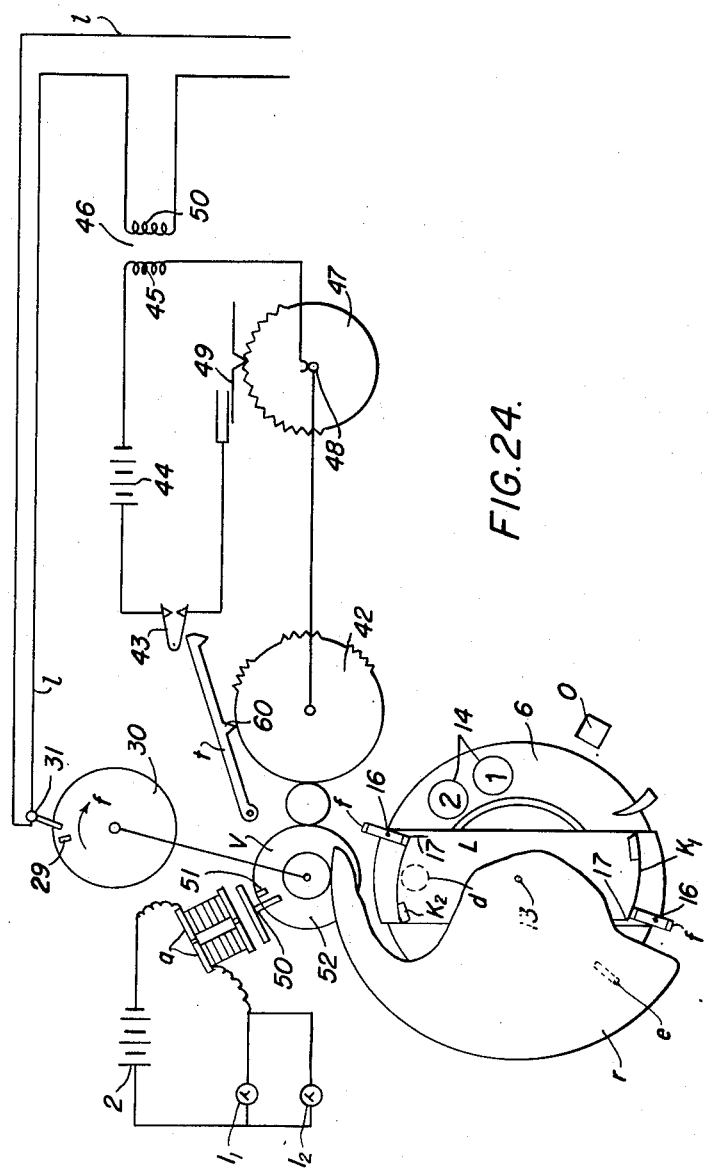
Fig. 24 is a diagrammatic view of the entire assembly.

Fig. 24 shows a diagrammatic view of the entire assembly and referring to this figure the following sets forth the general operation of the invention.

The apparatus for automatically alerting police help or any other subscriber is composed of main groups of the following elements:

1. The motor mechanism V controlling the movement of all elements in order to secure successively: placing the calling telephone in circuit, sending into the telephone line electrical impulses selecting the called station, sending to the called station sound signals characterizing the calling station.

2. The elements for disengaging the motor mechanism V.

3. The arrangement for placing the calling telephone in circuit.

4. The arrangement for sending into the telephone line electrical impulses for selecting the called station.

5. The arrangement for sending to the called station sound signals characterizing the calling station.

The motor mechanism constitutes a clock work V whose motor shaft drives by gearing:

(a) A wheel 30 placing the calling telephone station in circuit;

(b) A wheel r sending electrical impulses into the telephone line L in order to select the called station;

(c) A cam 42 and a cam 47 for sending to the called telephone station electrical signals characterizing and identifying the calling station.

The element for disengaging the clock mechanism V is formed by an electromagnet $a$ whose movable armature 50 cooperates with a projection 51 upon a wheel 52 of the clock mechanism in order to lock it as soon as said armature 50 is in contact with said projection 51.

The electromagnet $a$ is controlled by the switches $1^1$, $1^2$ and mounted in parallel and closing the electrical circuit of the electromagnet with its source of current 2.

By closing one of the switches, the electromagnet $a$ is energized and attracts its movable armature 50. This disengages the projection 51 and frees the clock mechanism V which is placed in rotation by the action of its spring, thereby driving the wheels 30, $r$, 42 and 47.

The rotation of the wheel 30 in the direction of the arrow $f$ leads the spur 29 into contact with the end of an electrical contact 31 controlling the telephone line 1.

The spur 29 by rotating, pivots said electrical contact 31 and causes its closing, thus placing it in the line of the calling telephone station.

The wheel $r$, by rotating, acts upon the sending device for the electrical impulses, selecting the calling telephone station. This transmitter for the electrical impulses for the selection uses a dial C of the automatic telephone which is controlled in the following manner:

A plate L rotates about an axis 13 of the telephone dial C of the automatic telephone. About this axis 13 a wheel $r$ rotates which carries a spur $e$. This plate L has upon its face opposite the disk $c$ for the selection of the numbers a projection $d$. This projection is sunk in one of the openings 14 of the disk C for selecting the numbers in such a way that the bar L is fixed to said disk C.

The bar L comprises upon its other plate and at each of its ends a leaf spring $k_1$, $k_2$.

The end of each spring $k_1$, $k_2$ is curved back and forms a hook 17.

Above each spring $k$ is located a locking finger $f$ oscillating about an axis 16. The end of each locking finger $f$ normally is supported upon the corresponding spring $k$.

A fixed abutment $o$ is mounted upon the chassis of the apparatus. It can come into contact with each locking finger $f$.

The device for composing the number of the called station operates in the following manner:

The finger $e$, after raising the hook of the telephone apparatus, comes into contact at the end of a certain rotation with the hook of one of the springs $k_1$.

The wheel $r$ then drives the bar L and consequently the disk 2 for the selection of the numbers which is fixed to it by the projection $d$.

This driving continues up to the moment where the locking finger $f$ corresponding to the spring $k_1$ receiving the spur $e$ comes into contact with the fixed abutment $o$. This abutment $o$ brings about a pivoting of the locking finger $f$ about its axis 16.

The spring $k$ rises, freeing the spur $e$. Consequently the bar L is disengaged from the wheel $r$ and returns to its initial position under the action of the recall springs of the disk for the selection of the numbers.

The first cipher of the called numbers is thus composed.

The second cipher is composed in the same manner, the spur $e$ coming then into contact with the second spring $k$ and drives the plate L until the locking finger $f$ corresponding encounters the abutment $o$.

The two ciphers forming the number are thus composed and the telephone apparatus is in communication with the desired station.

At this moment the telephone can transmit the indication of its number or any other indication.

This is carried out by driving the cams 42 and 47 which act in the following manner:

The primary 45 of a transformer 46 whose secondary is shunted upon the telephone line 1 is fed by a direct current source 44 through the intermediary of an interrupter 49 controlled by the teeth upon the rotating cam 47. This interrupter 49 interrupts the direct current furnished by the source 41 at a very rapid cadence.

The direct current is interrupted at a rhythm which is a function of the arrangement of the teeth on the cam 42 corresponding to the electrical signals characterizing the calling station.

These interruptions characterizing the calling station are effected through the intermediary of an oscillating lever $t$ cooperating by its point 60 with the cam teeth 42 and whose end acts upon the interrupter 43 mounted in series in the feed circuit for the primary 45 of the transformer 46.

The hammer $t$ oscillates at the rhythm of the passage of the teeth of the cam 42 and opens and closes the interrupter 43 at the same rhythm.

It results therefrom that the secondary 50 of the transformer 46 is the seat of an alternating electromotive force interrupted at the cadence of the passage of the teeth of the cam 42. This current is transmitted by the telephone line 28 to the receiving station.

The officer at the reception then hears an interrupted crackling at the cadence of the passage of the teeth of the cam 43 characterizing the calling post.

I claim:

1. In an apparatus for automatically calling a selected telephone station and then identifying the calling station to said selected station the combination of a clockwork, a device for releasing said clockwork, means for setting said clockwork in operation, rotary elements controlled by said clockwork means mounted on said rotary elements for successively establishing the circuit of the calling station, a dial for the selection of telephone numbers, means for operating said dial, a disc rotated by said clockwork, a spring fixed to said means for operating said dial, a lug upon said disc for engaging said spring and thereby coupling said means for operating said dial with said disc, a fixed stop for uncoupling said spring from said lug thereby releasing said means for operating said dial from said disc, means for returning said means for operating said dial to its initial position thereby setting up the first digit of he called telephone station number, a second spring fixed to said means for operating said dial and located opposite said first spring for setting up the second digit of the called telephone station number in the same manner and means for transmitting sound signals identifying the calling station to the called telephone station operated by said clockwork.

2. In an apparatus for automatically calling a selected telephone station and then identifying the calling station to said selected station the combination of a clockwork, means for setting said clockwork in operation, rotary elements controlled by said clockwork, means mounted on said rotary elements for establishing the circuit of the calling station, a source of direct current, an elastic blade, a toothed wheel driven by said clockwork and coacting with said elastic blade for pulsating said direct current, a disc having interrupted teeth thereon driven by said clockwork, an electrical contact operated by said disc, a transformer having the secondary winding connected to the telephone line and the primary winding in circuit with the pulsatory current created by the teeth of said disc operating upon said electrical contact so that the called station will receive signals identifying the calling station.

3. In an apparatus for automatically calling police help or other station the combination of a clock mechanism, means for setting said clock mechanism in operation, rotary elements controlled by said clock mechanism, means mounted on said rotary elements for establishing the circuit of the calling signal, a transformer, a source of direct current feeding the primary of said transformer, an interrupter for pulsating said direct current rapidly connected in series in the circuit of said primary, a toothed cam driven by said clock mechanism, a contact also connected in series in the circuit of said primary and means whereby the successive openings and closings of said contact are controlled by said cam relatively slowly to the rhythm of the passage of the teeth of said cam whose arrangement characterizes the calling apparatus whereby the secondary of said transformer is subjected to an alternating current modulated to the rhythm of the passage of the teeth of said cam and means for transmitting said modulated alternating current to the receiving station so that said receiving station receives a series of successive impulses characterizing the calling station.

ALEXANDRE SVOEKHOTOFF.

REFERENCES CITED

The following references are of record in the file of this patent:

UNITED STATES PATENTS

| Number | Name | Date |
|---|---|---|
| 528,075 | Chase | Oct. 23, 1894 |
| 750,270 | Decrow | Jan. 26, 1904 |
| 848,636 | Condon | Apr. 2, 1907 |
| 955,056 | Dean | Apr. 12, 1910 |
| 970,886 | Cole | Sept. 20, 1910 |
| 1,039,667 | Fellows | Sept. 24, 1912 |
| 1,225,935 | Dee | May 15, 1917 |
| 2,104,998 | Lill | Jan. 11, 1938 |